United States Patent [19]

Howell

[11] 4,294,384
[45] Oct. 13, 1981

[54] LIQUID DISPENSER HOLDER

[76] Inventor: Terrence D. Howell, Apt. 214, 3395 Yankee Doodle Rd., Eagan, Minn. 55121

[21] Appl. No.: 844,632

[22] Filed: Oct. 25, 1977

[51] Int. Cl.³ .......................... B60N 3/10; B60N 3/18
[52] U.S. Cl. .................................. 224/42.42; 108/44; 211/74
[58] Field of Search ...... 224/29 G, 42.42 R, 42.42 A, 224/42.45 R, 42.45 A, 42.45 B, 45 A, 42.42; 108/44; 211/74

[56] References Cited

U.S. PATENT DOCUMENTS

| | | | |
|---|---|---|---|
| D. 197,729 | 3/1964 | Beychok | 108/44 X |
| 1,389,508 | 8/1921 | Hodge | 211/74 |
| 2,897,974 | 8/1959 | Cook | 108/44 X |
| 3,690,724 | 9/1972 | Douglas et al. | 108/44 X |
| 3,893,569 | 7/1975 | Hoch | 108/44 X |
| 3,952,988 | 4/1976 | Easterly | 108/44 X |
| 4,055,286 | 10/1977 | Schmid | 224/42.45 R |

FOREIGN PATENT DOCUMENTS 966890   4/1975   Canada ................. 108/44

Primary Examiner—David A. Scherbel
Attorney, Agent, or Firm—Warren A. Sturm

[57] ABSTRACT

A liquid dispenser holder includes a cradle and cradle attachment means the former of which receives and holds an air pot and the latter of which provides stationary attachment of the cradle to a vehicle seat, transmission shroud, or floor. In one embodiment of the invention, the cradle comprises a base and a collar above the base. The cradle attachment means are a pair of elongate legs extending from the base. An extension of the collar provides a platform for supporting a receptacle in position under an air pot dispensing spout and the legs and underside of the base form a saddle for sitting the holder over a vehicle transmission shroud. Upon setting an air pot on the base, the air pot is held in place by the collar and dispensing fluids from the pot with a single hand is readily accomplished. A cup or mug is set on the platform, the dispensing spout positioned over the cup or mug by rotating the air pot, and the air pot handle operated in a normal fashion to dispense an accurate measure of liquid from the air pot, all with only the use of a single hand.

1 Claim, 6 Drawing Figures

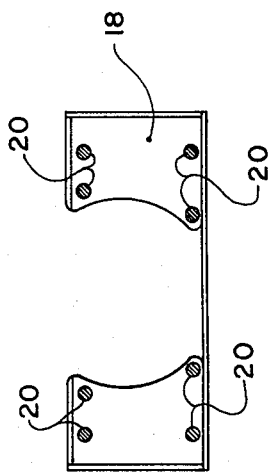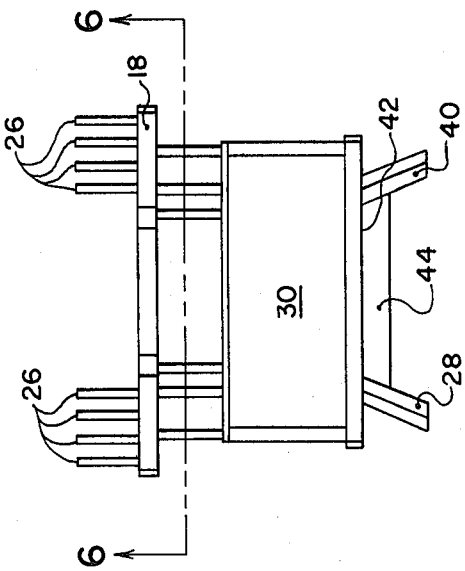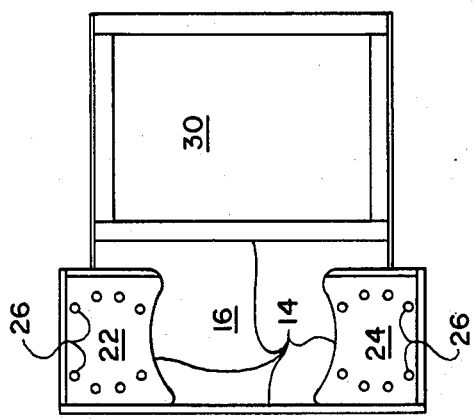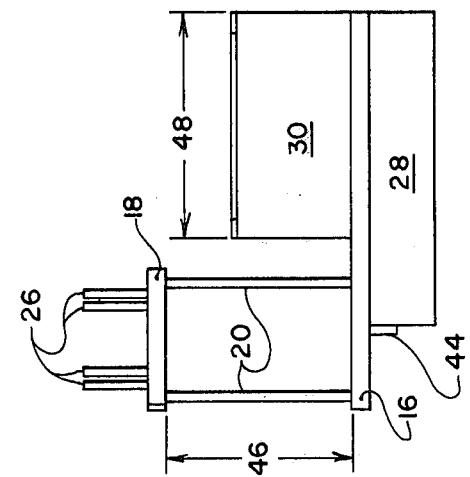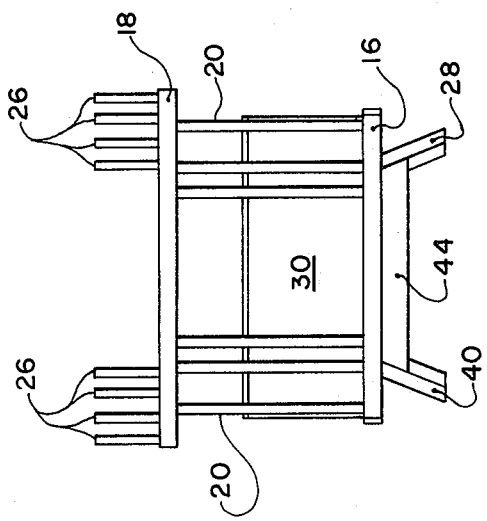

LIQUID DISPENSER HOLDER

BACKGROUND AND FIELD OF THE INVENTION

The invention relates to a holder for securing a liquid dispenser such as an Air Pot in a stable, stationary attitude in a moving vehicle and for securing a receptacle against movement relative to the dispenser.

"Liquid dispenser" and "container" are used synonymously herein. Consumption of beverages in a moving vehicle is a fact of life. Dispensing a beverage from a container into a receptacle such as a mug or cup in a moving vehicle presents a number of problems. This is true even for what is perhaps the most stable and easily operated container, an Air Pot which is self-supporting and has a spout from which fluids are dispensed by operating a small pump handle. For a passenger, even though both hands are free for use, coordinating the movements of the two hands so as to avoid spillage is nonetheless difficult. Of course for a driver there are even more problems the most serious of which no doubt would be the safety hazard resulting from a tendency at times for a driver to try to make at least partial use of the second hand while filling a receptacle.

An object of the present invention is to provide a holder for a container such as an Air Pot which minimizes spillage during filling of a receptacle with fluid from the container.

A further object of the invention is a holder which eliminates the need for hand coordination in filling a receptacle with fluid from a liquid dispenser.

A specific object of the invention is a holder for an Air Pot like container which permits operation of the container with only a single hand.

Another object of the invention is a holder for an Air Pot type container which makes it safe for a driver of a vehicle to fill a receptacle from the container.

BRIEF DESCRIPTION OF THE INVENTION

Briefly, the invention comprises a cradle and cradle attachment means. The cradle in a prototype embodiment comprised a base and a collar above the base. The attachment means comprised a pair of legs extending along and depending from the base. The legs diverged from each other in a direction away from the base. The legs together with a portion of the bottom of the base between the legs formed a saddle for sitting on a vehicle transmission shroud. Extensions of a portion of the collar provided a platform for supporting receptacles under an air pot dispensing spout.

BRIEF DESCRIPTION OF THE DRAWINGS

FIG. 2 is a detailed plan front view of the holder of FIG. 1;

FIG. 3 is a side view of the holder of FIG. 2;

FIG. 4 is a top view of the holder of FIG. 2;

FIG. 5 is a rear view of the holder of FIG. 2; and,

FIG. 6 is a sectional view along line 6—6 of FIG. 5.

DETAILED DESCRIPTION OF THE INVENTION

Figure 1:
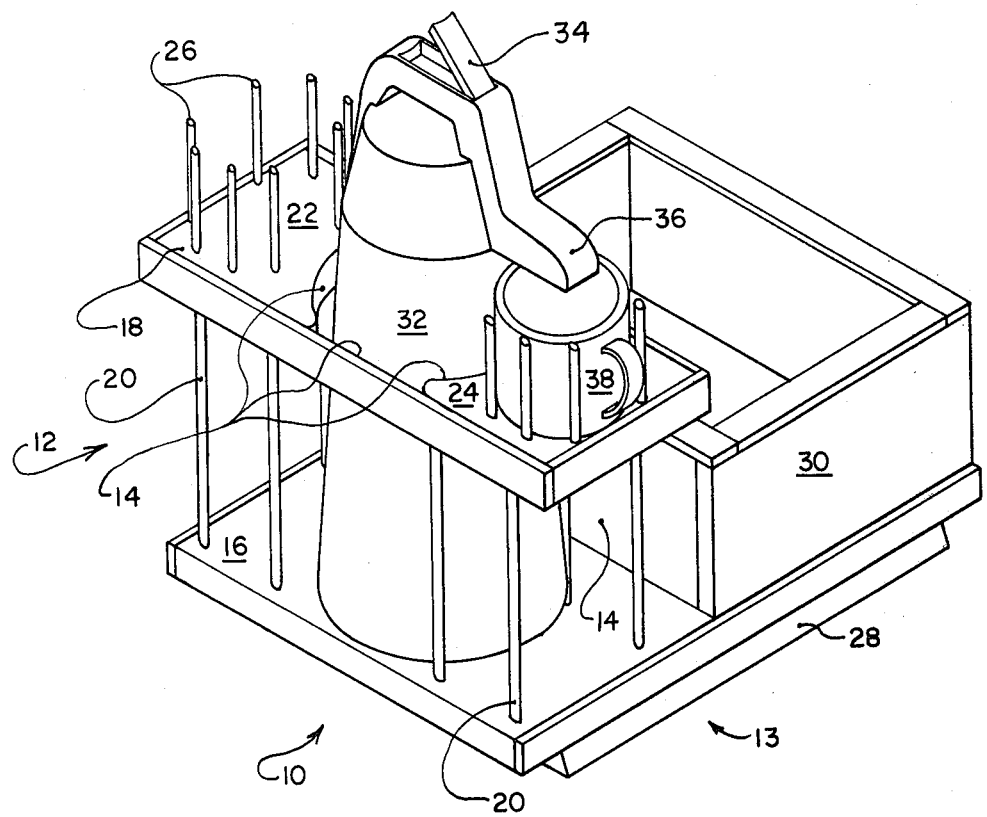
FIG. 1 is a perspective view of a liquid dispenser holder according to the present invention.

A liquid dispenser holder according to the present invention is shown generally as 10 in FIG. 1. The embodiment of the invention shown in FIG. 1 is a prototype model which was specifically designed for sitting on a vehicle transmission shroud. Holder 10 comprises a cradle shown generally as 12 and cradle attachment means shown generally as 13. Cradle 12 includes a collar 14 and base 16. Holder 10 also includes a receptacle holding means in the form of a platform 18 which is an extension of part of collar 14. Dowels 20 extend between the underside of platform 18 and top of base 16. Platform 18 also includes a pair of receptacle filling stations 22 and 24 each of which are defined by a set of pegs 26. Cradle attachment means 14 comprises a pair of elongate legs one of which is visible in FIG. 1 and is designated as 28 and the portion of the underside of base 16 between legs 28 and 40. For the illustrated prototype embodiment, cradle 12 also includes a ballast compartment 30 the front wall of which forms a part of collar 14. An Air Pot 32 having a pump handle 34 and dispenser spout 36 is seated on base 16 and a cup 38 is supported at filling station 24 of platform 18 in position under spout 36 for receiving fluid from Air Pot 32. Although not shown in FIG. 1, air pots typically include a turn table bottom which permits easy rotation of the container from one filling station to another. Of course, a turn table could be built into base 16 for containers which did not themselves include a turn table.

Fluids are easily dispensed from an Air Pot 32 or similar container with only a single hand. A cup 38 is set in a filling station such as at filling station 24 as shown in FIG. 1. The container dispenser spout 36 is positioned over the cup 38 and the container handle 34 is pumped to dispense a liquid into the cup 38. The container is then rotated to remove the dispenser spout from over cup 38 to complete the process. Because each of the foregoing steps can be performed readily with only a single hand, two hand miscordination is completely eliminated, spillages from other causes is also reduced, and driver safety is improved. And because the one hand which is used performs only a pumping instead of a positioning function, hand coordination is entirely eliminated from the filling process.

FIGS. 2-5, each a detailed plan and respectively, a front, side, top, and rear view of the prototype embodiment of FIG. 1, and FIG. 6, a sectional view taken along line 6—6 of FIG. 5 show more details of the construction of the holder 10. Leg 28, its counterpart leg 40, and the underside 42 of base 16 between the legs form a saddle for sitting of the holder 10 on a vehicle transmission shroud. The prototype has been found to work well even though the underside 42 did not make contact with the top of the transmission shroud. The prototype was specifically designed for use in a 1971 Dodge Demon which dictated the front to rear taper of the legs 28 and 40 from a 6¾ inch (17.12 cm.) spacing at the leg tips in the front to a 7¾ inch (21.24 cm.) spacing between the rear tips of the legs, both spacings being measured from the inside of the legs. A crossbrace 44 was provided across the front of legs 28 and 40. The drawings of FIGS. 2-6 are to scale. In the actual prototype, dimension 46 was 6¾ inches (18.50 cm.); dimension 48 was 8 inches (21.92 cm.); dowels 20 were each ⅜ inch pine dowels; pegs 26 were ¼ inch (0.68 cm.) pine; compartment 30 and legs 28 and 40 were actually and the end pieces of platform 18 which formed filling stations 22 and 24 were effectively ½ inch (1.37 cm.) plywood; base 16 was ¾ inch (2.05 cm.) plywood; crossbrace 44 was ⅜ inch pine; and the trim strips of collar 14, platform 18 and on top of ballast compartment 30 were ¼ inch (0.068 cm.) by ¾ inch (2.05 cm.) oak.

Although the prototype embodiment of FIGS. 1-6 was specifically designed for sitting on the transmission shroud of a vehicle, it has also been found suitable for use on the seat or floorboard of a vehicle. Were a holder 10 to be used exclusively in either of these latter two positions, legs 28 and 40 would either be extended or moved forward under Air Pot 32. Legs 28 and 40 were arbitrarily made shorter than and positioned to the rear of base 16. Compartment 30 provides added stability in any position in which the holder 10 is used when filled with ballast and in addition provides a convenient, accessable storage area for utilitarian articles.

It is contemplated that it may be desirable to manufacture the invention as a molded plastic article. And, further possible desireable variations of the invention include incorporation of a fiber interlocking material on either or both the underside 42 of base 16 or inside of the legs 28 and 40 or even to provide for semi-permanent attachment of a holder 10 with a fastener such as a metal screw inserted through flanges added to the base of legs 28 and 40. These alternatives and the foregoing described prototype embodiment have been given by way of illustration and not limitation and other variations and modifications obvious to one of ordinary skill in the art are deemed within the scope of the invention. Having described how to make and use the invention by means of the prototype embodiment and the best mode for carrying out the invention contemplated by the inventor, the true scope of the invention is set forth in the following claims.

What is claimed is:

1. A liquid dispenser holder, comprising:

(A) a cradle for receiving and holding a liquid dispenser such as an Air Pot, which cradle includes a cradle base having a planar member for setting thereon of a dispenser and a collar supported vertically above the base for at least partially encircling the upper portion of a said dispenser to prevent the dispenser from tipping;

(B) cradle attachment means adapted to hold the cradle stationary when the cradle is on a vehicle seat, transmission shroud, or floor, which attachment means includes a pair of planar leg members rigidly attached to and depending from said cradle base and diverging from each other in two directions, which leg members are longitudinally elongate, closer together at one end than the other and closer together at their juncture with said cradle base than at their bottoms to form a saddle for securely engaging a transmission shroud graduating dimensionally either longitudinally or vertically;

(C) a ballast compartment supported by said base for accepting ballast or utilitarian articles of sufficient weight to stabilize said cradle; and (D) receptacle holding means for supporting a receptacle in position under and to receive a fluid from an Air Pot dispensing spout, which holding means includes a platform which in turn is an extension of said collar and has at least one receptacle filling station having means for releasably engaging a receptacle such as a coffee mug and which receptacle holding means is supported vertically above said cradle base, whereby all the steps for filling a receptacle from a dispenser such as an Air Pot can be accurately and safely performed with only one hand.

* * * * *